Aug. 27, 1957 B. A. BJÖRK 2,804,184
MAGNET COUPLING
Filed April 24, 1953
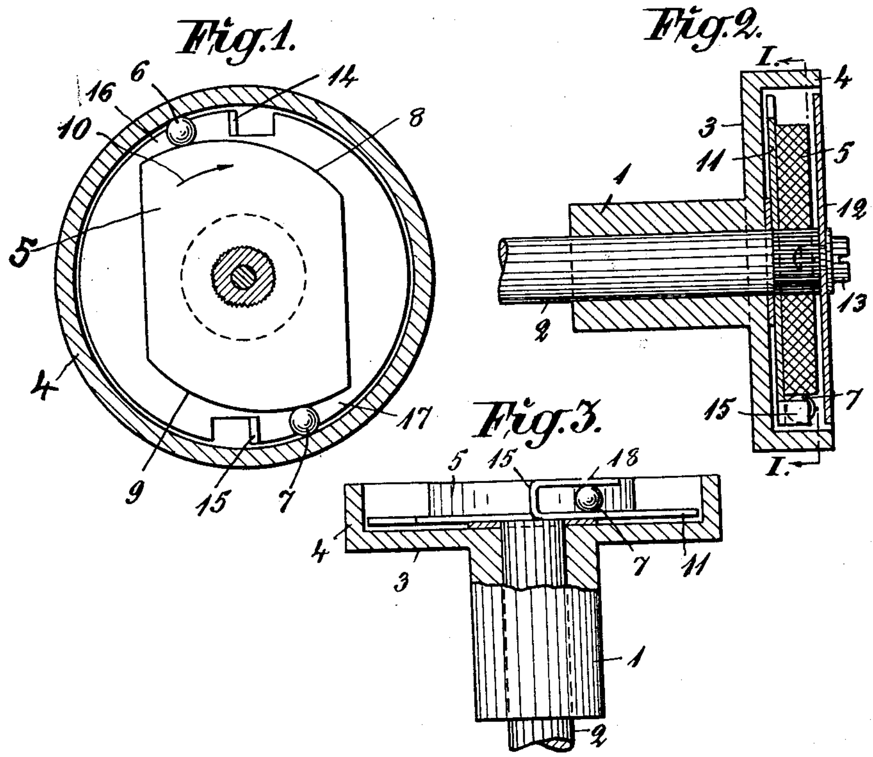
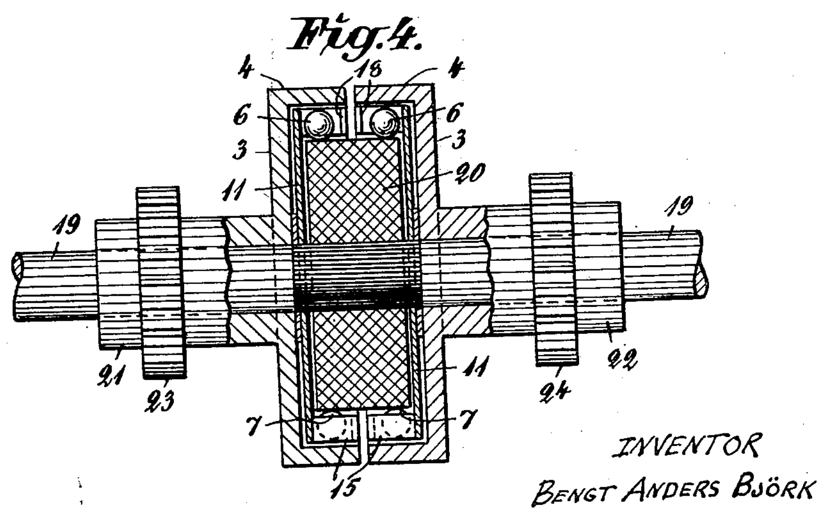
INVENTOR
BENGT ANDERS BJÖRK
BY Robert E Burns
ATTORNEY United States Patent Office 2,804,184

Patented Aug. 27, 1957

2,804,184

MAGNET COUPLING

Bengt Anders Björk, Halmstad, Sweden, assignor to Haldex Aktiebolag, Halmstad, Sweden Application April 24, 1953, Serial No. 350,890

Claims priority, application Sweden April 26, 1952

7 Claims. (Cl. 192—45)

The present invention refers to couplings of the type wherein a driving and a driven motion member are adapted to be coupled together by means of unilaterally acting locking members arranged in frictional engagement with the motion members. In a known type of such couplings two shafts are adapted to be coupled together by means of a disk arranged on one of the shafts and a ring arranged on the other shaft, with balls or rolling bodies arranged between said disk and ring members, said ball or rolling bodies being jammed tight in between converging surface portions of the disk and ring at a rotary movement in one direction while being rendered inoperative at a rotation in the opposite direction but still maintained in a position prepared for locking. To operate satisfactorily such couplings have to be constructed with very great precision and have to be provided with spring-actuated lever mechanisms for the actuation of the locking members, whereby the structure is made complicated and expensive.

The present invention has for its object to simplify such couplings by reducing the number of movable parts to a strict minimum. To this end the locking members, which consist of a magnetically conducting material, are arranged to be freely movable in a magnetic field of a magnet arranged in the coupling and tending to keep the locking members in frictional engagement with the converging surface portions, in a manner such that the motion members are coupled together at a movement in one direction and are released at a movement in the opposite direction. Hereby the mechanical auxiliary means otherwise required for the same purpose are obviated. According to a suitable form of embodiment of the invention, the one motion member consists of a magnet, preferably a permanent magnet, while the other motion member consists of a magnetically conducting material. In the above-named known type of coupling, the disk arranged on one of the shafts may thus be constituted by a magnet, while the ring is made from a magnetically conducting material, the magnetic field then becoming the densest at the adjacent portions of the frictional surfaces located closest to each other, so that the locking members will be actuated in the proper direction to be continuously held in contact with the frictional surfaces.

The invention will be described more closely with reference to the accompanying drawing, wherein Fig. 1 is an endwise view and Fig. 2 a longitudinal section of an embodiment of the invention. Fig. 3 shows a modification of said embodiment. Fig. 4 shows a further embodiment of the invention, partly in longitudinal section.

The coupling shown in Figs. 1 and 2 is intended for coupling two coaxial shafts to one another, the one shaft 1 being hollow and formed as a bearing for the other shaft 2. The coupling member secured to the shaft 1 consists of a disk 3 with an annular flange 4, while the coupling member secured to the shaft 2 consists of a disk-shaped permanent magnet 5, which is forced onto the grooved end of the shaft. In the example shown, the locking members consist of two balls 6 and 7, which at a rotary movement in one direction are tightly jammed into frictional engagement between the inner cylindrical surface of the flange 4 and the opposed edge surfaces 8 and 9, respectively, of the coupling member 5. Said edge surfaces are shaped so as to converge toward the inside of the flange 4, the locking members then becoming operative only at a rotary movement in the one direction while being released at a rotary movement in the opposite direction. If the shaft 2 constitutes the driving motion member, for example, the two shafts will be coupled together when said shaft 2 rotates in the direction indicated by the arrow 10 in Fig. 1. The balls 6 and 7 are retained in their places between the two coupling members 4 and 5 by ball holders consisting of an inner plate 11 secured to the shaft 2 and an outer covering plate 12, which is screwed fast onto the end of the shaft 2. The inner plate 11 is provided with two lobes 14 and 15 cut from the edge portion of the plate and bent axially outwards, said lobes limiting in one direction the space which is closest to the respective ball between the two coupling members 4 and 5.

In the modification shown in Fig. 3, the lobes 14 and 15 are extended and bent twice, so that their end portions 18 extend in a plane parallelling the inner plate 11, said end portions thus limiting the space of movement of the balls in the axial direction. Hereby, the outer covering plate 12 is made superfluous. Otherwise, the coupling agrees with the embodiment according to Figs. 1 and 2.

To transmit two independent movements onto a common shaft, a coupling arrangement as shown in Fig. 4 may preferably be made use of. In this construction, two couplings according to the modification in Fig. 3 are arranged on the same shaft 19, whereon said couplings face one another, one of the coupling members of each coupling, that is to say the magnet 20, being then common to the two couplings and thus wider than the corresponding member in an ordinary single coupling. The mode of operation of each individual coupling is the same as above described for a single coupling.

For the connection of the hollow shafts 21 and 22 to the respective mechanisms they are provided with gear wheels 23 and 24 arranged thereon. The couplings may be so arranged that the shaft 19 is entrained in the same direction of rotation by both couplings and both shafts 21 and 22, or in opposite directions when the two shafts 21 and 22 mutually rotate in the same direction.

The double-coupling described may of course be constituted by two separate couplings with separate magnets but mutually facing one another as in Fig. 4, but here the north and south poles of the respective magnets must be located opposite one another, as the magnetic circuit would otherwise be closed through the magnets themselves and not through the respective outer coupling halves. In this case the balls would not be kept in a position prepared for locking, but would roll down toward the bottom positions of the ball holders.

The coupling may of course be constructed in a variety of ways within the scope of the present invention, the coupling arrangements as illustrated and described above only representing suitable embodiments of the invention.

What is claimed is:

1. In an engageable and free-wheeling clutch mechanism in combination, a pair of cooperating substantially coaxial members having spaced opposite faces and being movable relative one another, one of said cooperating members comprising an outer coupling member having a substantially cylindrical inner face, the other of said members comprising an inner coupling member having faces opposite the said inner face and converging toward said inner face at predetermined angles, the converging faces of said inner coupling member comprising magnetic poles constantly forming a magnetic circuit between the opposite faces of said inner and outer coupling members, a plurality of locking members positioned between the spaced converging faces of the inner coupling member and the inner face of the outer coupling member, said locking members slidably engaging the faces of said coupling members being in constant engagement therewith and having a dimension greater than the distance between said spaced faces of the coupling members at a point where they are the closest, and the direction of convergence determining the direction in which said mechanism is engageable and free-wheeling when one of said coupling members is driven.

2. Mechanism according to claim 1, in which said inner member comprises a permanent magnet and said outer coupling member being of a material capable of sustaining a magnetic circuit.

3. Mechanism according to claim 1, including means for maintaining said locking member adjacent the point where the opposite faces of said coupling members are the closest and for permitting substantially instantaneous engagement between the inner and outer coupling members when the driven member is driven in a direction for engaging the coupling members.

4. Mechanism according to claim 1, further including another outer coupling member cooperating with said inner coupling member and said inner coupling member converging faces converge in a direction permitting engagement of all of said coupling members in only one direction when said outer coupling members are driven.

5. Mechanism according to claim 1, further including another outer coupling member cooperating with said inner coupling member, and said inner coupling member has converging faces converging in one direction with respect to the one outer coupling member inner face and faces converging in an opposite direction with respect to the other coupling member inner face, whereby the mechanism is engageable in two directions when the inner coupling member is driven and when the outer coupling members are driven.

6. Coupling consisting of an outer coupling member with a coupling surface and an inner coupling member with coupling surfaces converging towards said outer coupling surface and locking members between the coupling surfaces of said outer and inner coupling members which locking members are kept in permanent contact with said coupling surfaces through magnetic attraction and which slide along the coupling surface of said outer coupling member at free-wheeling but are gripped between the coupling surfaces of said outer and inner coupling members at rotation in a coupling direction thereby locking said coupling members to each other, the inner coupling member being a magnet, the poles of which are situated at portions lying nearest the coupling surface of said outer coupling member.

7. Coupling consisting of two coaxially mounted outer coupling members each provided with a coupling surface and an inner coupling member common to said outer coupling members and provided with coupling surfaces converging towards the coupling surfaces of said outer coupling members and locking members between the coupling surfaces of said outer and inner coupling members which locking members are kept in permanent contact with said coupling surfaces through magnetic attraction and which slide along the coupling surfaces of said outer coupling members at free-wheeling but are gripped between the coupling surfaces of said outer and inner coupling members at rotation in a coupling direction thereby locking said coupling members to each other, the inner coupling member being a magnet the poles of which are situated at portions lying nearest the coupling surfaces of said outer coupling members.

References Cited in the file of this patent

UNITED STATES PATENTS

| | | |
|---|---|---|
| 2,019,367 | Szekely | Oct. 29, 1935 |
| 2,300,223 | Hottenroth | Oct. 27, 1942 |
| 2,410,818 | Grant | Nov. 12, 1946 |
| 2,583,843 | Herrick | Jan. 29, 1952 |